(12) United States Patent
Puppala et al.

(10) Patent No.: US 12,547,453 B2
(45) Date of Patent: Feb. 10, 2026

(54) GRAPH STREAMING NEURAL NETWORK PROCESSING SYSTEM AND METHOD THEREOF

(71) Applicant: Blaize Inc., El Dorado Hills, CA (US)

(72) Inventors: Venkata Ganapathi Puppala, Hyderabad (IN); Val G. Cook, Shingle Springs, CA (US); Srinivasulu Nagisetty, Hyderabad (IN)

(73) Assignee: Blaize Inc., El Dorado Hills, CA (US)

( * ) Notice: Subject to any disclaimer, the term of this patent is extended or adjusted under 35 U.S.C. 154(b) by 425 days.

(21) Appl. No.: 18/210,706

(22) Filed: Jun. 16, 2023

(65) Prior Publication Data

US 2023/0418666 A1 Dec. 28, 2023

(30) Foreign Application Priority Data

Jun. 22, 2022 (IN) .............................. 202241035865

(51) Int. Cl.
*G06F 9/48* (2006.01)
*G06F 15/80* (2006.01)

(52) U.S. Cl.
CPC ........ *G06F 9/4881* (2013.01); *G06F 15/8015* (2013.01)

(58) Field of Classification Search
None
See application file for complete search history.

(56) References Cited

U.S. PATENT DOCUMENTS

| | | | |
|---|---|---|---|
| 6,904,446 B2 | 6/2005 | Dibrino | |
| 7,856,544 B2* | 12/2010 | Schenfeld | G06F 15/17343 709/231 |
| 9,928,109 B2* | 3/2018 | Durant | G06F 9/542 |
| 11,126,462 B2* | 9/2021 | Koneru | G06F 9/4881 |
| 11,150,961 B2* | 10/2021 | Agarwal | G06F 16/9024 |
| 11,416,282 B2* | 8/2022 | Koneru | G06F 9/4843 |
| 11,436,045 B2* | 9/2022 | Agarwal | G06F 9/3851 |
| 11,513,845 B2* | 11/2022 | Koneru | G06F 9/4881 |

(Continued)

OTHER PUBLICATIONS

Sun et al. "A Stable Online Scheduling Strategy for Real-Time Stream Computing Over Fluctuating Big Data Streams", 2016 EEEE, pp. 8593-8607.*

(Continued)

*Primary Examiner* — Van H Nguyen
(74) *Attorney, Agent, or Firm* — Brian R. Short

(57) ABSTRACT

Disclosed herein is a graph streaming neural network processing system comprising a first processor array, a second processor, and a thread scheduler. The thread scheduler dispatches a thread of a first node to the first processor array or the second processor, wherein the thread is executed to generate output data comprising a data unit stored in a private data buffer of the second processor. The thread scheduler determines that the data unit is sufficient for executing a thread of a second node. The second node is dependent on the output data generated by execution of a plurality of threads of the first node. Upon determining that the data unit is sufficient, the thread scheduler dispatches the thread of the second node. The thread scheduler determines to dispatch a subsequent thread of the first node for execution when a predefined threshold buffer size is available on the private data buffer.

18 Claims, 7 Drawing Sheets

(56) References Cited

U.S. PATENT DOCUMENTS

| | | | |
|---|---|---|---|
| 11,822,960 B2* | 11/2023 | Puppala | G06F 9/4881 |
| 2019/0114534 A1 | 4/2019 | Teng et al. | |
| 2019/0325551 A1 | 10/2019 | Cook et al. | |
| 2020/0293367 A1 | 9/2020 | Andrei et al. | |
| 2020/0293867 A1 | 9/2020 | Shao et al. | |

OTHER PUBLICATIONS

Besta et al. "Practice of Streaming Processing of Dynamic Graphs: Concepts, Models, and Systems", 2021 EEEE, pp. 1860-1876.*

* cited by examiner

GRAPH STREAMING NEURAL NETWORK PROCESSING SYSTEM AND METHOD THEREOF

RELATED APPLICATIONS

This patent application claims priority to foreign filed India Patent Application Serial No. 202241035865 filed Jun. 22, 2022, which in herein incorporated by reference.

FIELD OF THE DISCLOSURE

Embodiments of the present disclosure are related, in general to a processor architecture and in particular to an architecture of a graph streaming processing system and a method thereof.

BACKGROUND

A graph streaming processing system generally comprises an array of processors to execute a workflow, for example, an image processing operation such as image classification or image segmentation. The graph streaming processing system enables parallel processing of threads associated with different stages of the workflow using an array of processors or multi-core processors. Conventional graph streaming processing systems distribute execution of each stage of the workflow among the different processors of the processor array. If the graph involves neural network operations, specialized processors called neural network accelerators are used to process such operations since the neural network accelerators are designed to optimize and fasten the execution of the neural network operations. However, when a workflow includes both the neural network and general-purpose operations, executing all the operations on the neural network accelerator may not be possible since the neural network accelerator supports only some functions, such as a fixed set of convolution operations. Hence, there is a requirement for a processor architecture that enables execution of the workflows with a combination of both neural network operations and general-purpose operations and can be optimized for any type of processing operations.

Further, in the conventional graph streaming processing systems, each processing operation requires an input data buffer to read inputs and an output data buffer to write outputs. Currently, these data buffers occupy ample amount of memory for each processing operation. Thus, there is a need for an efficient graph streaming processing system that optimizes the amount of memory space required to store the inputs and outputs of each processing operation, thereby significantly reducing the requirement of memory. Further, there is also a requirement to manage such optimized memory spaces for sharing across the processing systems.

The information disclosed in this background of the disclosure section is only for enhancement of understanding of the general background of the invention and should not be taken as an acknowledgement or any form of suggestion that this information forms the prior art already known to a person skilled in the art.

SUMMARY

One or more shortcomings of the prior art are overcome, and additional advantages are provided through the present disclosure. Additional features and advantages are realized through the techniques of the present disclosure. Other embodiments and aspects of the disclosure are described in detail herein and are considered a part of the claimed disclosure.

Accordingly, the present disclosure relates to a graph streaming processing system comprising a first processor array, a second processor, and a thread scheduler. The thread scheduler is configured to dispatch at least one thread associated with a first node, to one of the first processor array and the second processor, to generate an output data comprising at least one data unit. The at least one data unit is stored in a private data buffer of the second processor. Further, the thread scheduler is configured to determine that the at least one data unit is sufficient for executing at least one thread of a second node, wherein the second node is identified to be dependent on the output data generated by execution of a plurality of threads of the first node. Furthermore, the thread scheduler is configured to dispatch the at least one thread of the second node, to at least one of the first processor array and the second processor, upon determining that the at least one data unit is sufficient. Finally, the thread scheduler is configured to determine to dispatch at least one subsequent thread of the first node for execution when a predefined threshold buffer size is available on the private data buffer.

Further, the disclosure relates to a method for scheduling of threads, performed by a thread scheduler of a graph processing system. The method comprises dispatching at least one thread associated with a first node, to at least one of a first processor array and a second processor, to generate an output data comprising at least one data unit. The at least one data unit is stored in a private data buffer of the second processor. Further, the method comprises determining that the at least one data unit is sufficient for executing at least one thread of a second node. The second node is identified to be dependent on the output data generated by execution of a plurality of threads of the first node. The method further comprises dispatching the at least one thread of the second node, to at least one of the first processor array and the second processor, upon determining that the at least one data unit is sufficient. The method further comprises determining to dispatch at least one subsequent thread of the first node for execution when a predefined threshold buffer size is available on the private data buffer.

The foregoing summary is illustrative only and is not intended to be in anyway limiting. In addition to the illustrative aspects, embodiments, and features described above, further aspects, embodiments, and features will become apparent by reference to the drawings and the following detailed description.

BRIEF DESCRIPTION OF DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of device or system and/or methods in accordance with embodiments of the present subject matter are now described, by way of example only, and with reference to the accompanying figures, in which.

Figure 1:
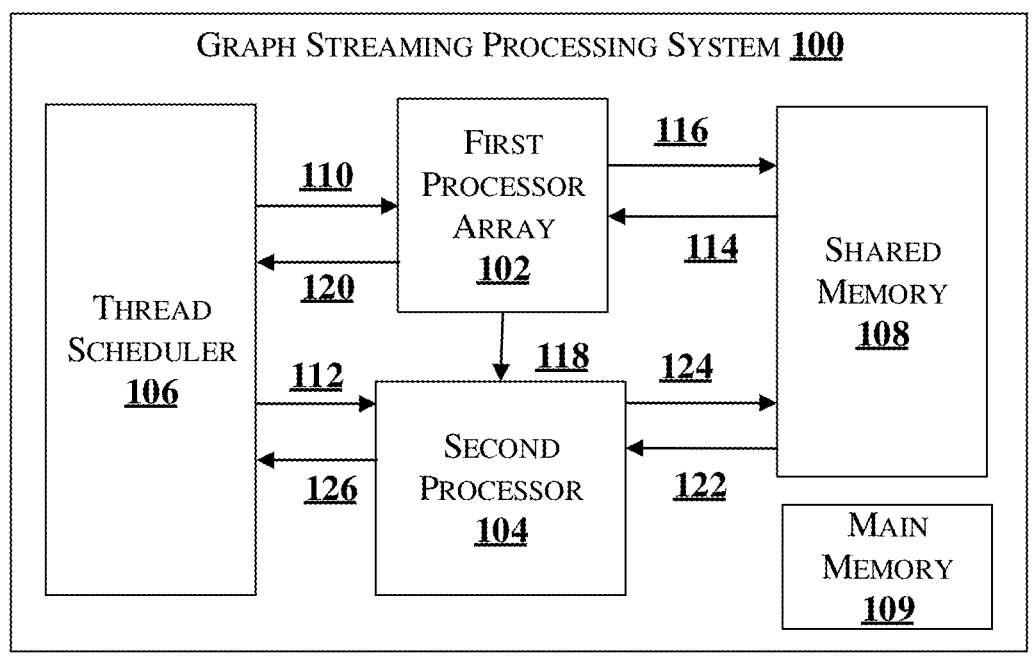
FIG. 1 illustrates an exemplary architecture of a graph streaming processing system in accordance with some embodiments of the present disclosure.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an exemplary architecture of a graph streaming processing system in accordance with some embodiments of the present disclosure.

As shown in FIG. 1, the exemplary graph streaming processing system 100 is configured to enable several nodes of a graph to execute one or more operations, which are not solely related to neural network applications, in streaming manner. In an embodiment, the graph streaming processing system 100 comprises a first processor array 102, a second processor 104, a thread scheduler 106, a shared memory 108 and a main memory 109. The first processor array 102 is configured to execute a plurality of operations related to any action associated with a graph structure. The second processor 104, for example may be a neural network accelerator, that is configured to execute a plurality of fixed function operations. Both the first processor array 102 and the second processor 104 access and use the shared memory to retrieve input data required for execution of one or more threads or to store output data generated by execution of one or more threads. The main memory 109 is used to store and/or retrieve information about input data required to execute the operations associated with the graph structure. For example, the graph structure represents a workflow related to image processing techniques such as image classification or image segmentation and the main memory 109 stores a plurality of images used as input for image classification or segmentation.

In an embodiment, the graph streaming processing system 100 may execute tasks or threads of a workflow in a streaming manner. The graph streaming processing system 100 may decompose the workflow into a data structure such as a graph structure that comprises a plurality of stages. Each stage comprises a plurality of nodes which represent a thread of the workflow. The first processor array 102 or the second processor 104 may execute the threads of each node of the workflow. In an implementation, the thread scheduler 106 is a hardware component comprising a plurality of sub-components each associated with a stage of the graph structure. Each sub-component of the thread scheduler 106 may dispatch threads of a node of a stage to either the first processor array 102 or the second processor 104. Further the sub-components of the thread scheduler 106 may also track execution of the dispatched thread and may dispatch further threads to the node or another node.

In one embodiment, the thread scheduler 106 may include at least one sub-component associated with a parent stage of the graph and at least one sub-component associated with a child stage of the graph. The parent stage of the graph may include a plurality of parent nodes executing tasks that generate output data, which is used as input for executing tasks of a plurality of child nodes of the child stage of the graph. The thread scheduler 106 may dispatch the threads of the plurality of nodes for parallel processing. In one embodiment, the thread scheduler 106 may dispatch threads of a parent node and a child node at the same time. The method performed by the thread scheduler for such parallel dispatching of threads has been further explained in detail.

The thread scheduler 106 schedules a plurality of threads, associated with the workflow of operations, to one of the first processor array 102 and the second processor 104. The threads may be related to the workflow that include one or more processing techniques, such as an image processing, represented as a data structure such as a graph. The one or more processing techniques may include, but not limited to, image classification, image segmentation and the like. The one or more processing techniques may include steps involving one or more convolution operations to be executed by the second processor 104 in addition to steps that may be executed by the first processor array 102. The graph structure may be represented as a tree structure with plurality of nodes in plurality of stages or levels, each stage comprising a plurality of nodes. Nodes of each stage are dependent on nodes of a previous stage. For example, a node of a first stage may represent a convolution 3×3 operation on input image data and another node of a second stage may represent a depth wise convolution operation on input image data that is dependent on output generated by the node of the first stage.

The thread scheduler 106 may receive information related to the above graph structure, herein also referred to as a graph, and may schedule threads to one of the first processor array 102 and the second processor 104. The first processor array 102 and the second processor 104 are coupled to the shared data buffer 108 to read and/or write data. The first processor array 102 is also coupled with the second processor 104 to write data into a private data buffer of the second processor 104.

The thread scheduler 106 is coupled to the first processor array 102 and the second processor 104. The thread scheduler 106 is configured to receive information associated with the graph. The thread scheduler 106 determines a plurality of threads and schedules sequence and execution of the plurality of threads. In some embodiments, the thread scheduler 106 is configured within a compiler (not shown in FIG. 1) of the graph streaming processing system 100. In some embodiments, the thread scheduler 106 may be configured outside the compiler and coupled with the compiler. In some embodiments, the thread scheduler 106 may be implemented as a combination of hardware and software.

The first processor array 102 may be a multi-core processor that is programmable and capable of executing any type of operations related to the graph. In one embodiment, the first processor array 102 may be an array of plurality of processors working in parallel. Each processor of the first processor array 102 may be implemented as a hardware component or as a combination of both hardware and software. Each processor may have access to a dedicated or shared memory, input/output interface, microprocessors, microcontrollers, programmable logic devices, and the like. Each processor may be a general-purpose processor, an application specific integrated circuit, a digital signal processor, a media processor, a field programmable gate array, and the like. The first processor array 102 is capable of performing any type of general-purpose operations such as addition, multiplication, shifting, and the like. In particular, the first processor array 102 may be configured to perform operations that may not be generally performed by the second processor 104 as the second processor 104 may be optimised to perform only a fixed number of operations explained in detail below. For example, the first processor array 102 is used to perform operations such as a 5×5 convolution operation, sigmoid function operation, etc.

The second processor 104 may be a processor that is configured to process fixed functions such as neural network operations. In an embodiment, the second processor 104 may be implemented as a hardware component, a software or a combination of both hardware and software. When the second processor 104 is implemented as a hardware, the second processor 104 may comprise and/or have access to a memory, input/output interfaces and one or more processors optimized to implement fixed functions. In some embodiments, the second processor 104 may also comprise software components such as acceleration libraries including libraries that provide fixed functions, including, but not limited to, predefined and optimized implementations of neural network layers and other types of neural network structures. The second processor 104 may interface with the software components to execute the fixed functions in an optimized and an accelerated manner. In some embodiments, the second processor 104 may comprise a multi-core processor, including a number of processor elements, to distribute the fixed functions among each one of the processor elements and implement the functions of the second processor 104 in parallel.

In some embodiments, the second processor 104 implements one or more operations that are widely used in deep neural networks. For example, the second processor 104 is configured to perform fixed functions including a 1×1 convolution operation, a 3×3 convolution operation, a matrix multiplication operation and a depth wise convolution operation. In another example, the second processor 104 is configured to perform other fixed functions including a batch normalization operation, a rectified linear unit operation, a leaky rectified linear unit operation and a binary summation operation.

The shared data buffer 108 is coupled with the first processor array 102 and the second processor 104. In some embodiments, the shared data buffer 108 may be, without limitation, a level-2 cache memory required to store output data generated by the second processor 104 and/or the first processor array 106. The shared data buffer 108 is shared by the first processor array 106 and the second processor 104 to store or retrieve information. The shared data buffer 108 comprises input data required to execute a thread associated with a node of the graph. The shared data buffer 108 may comprise read and write interfaces to read and write data from and into the shared data buffer 108. The first processor array 102 and the second processor 104 may read data from the shared data buffer 108 and write data into the shared data buffer 108.

Figure 2:
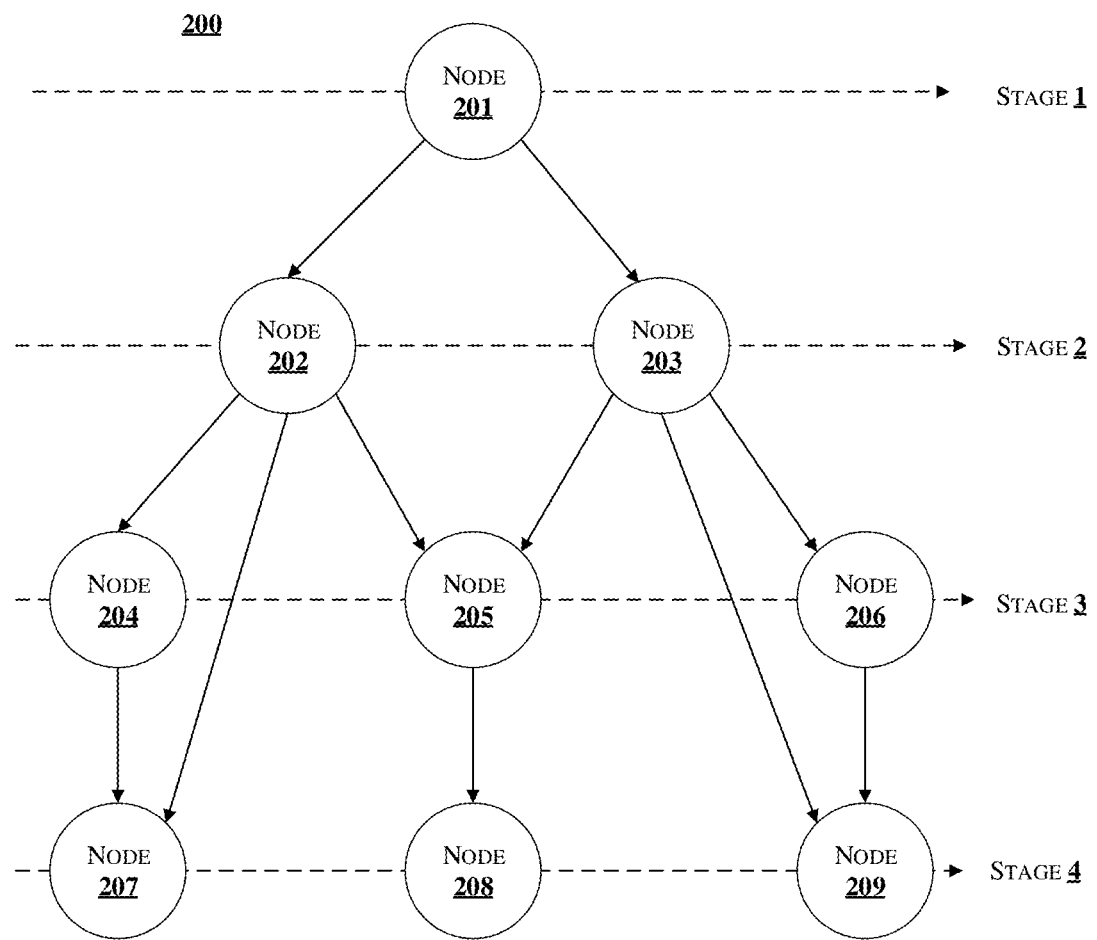
FIG. 2 illustrates an exemplary graph comprising a plurality of nodes in accordance with some embodiments of the present disclosure.

FIG. 2 illustrates an exemplary graph comprising a plurality of stages in accordance with some embodiments of the present disclosure.

The graph 200 comprises a plurality of stages and a plurality of nodes 201, 202, 203, 204, 205, 206, 207, 208 and 209. The graph 200 comprises a root node and other nodes. A root node of a graph is an ancestor of all other nodes in the graph. As shown in FIG. 2, node 201 is the root node of the graph 200. The graph 200 also comprises a plurality of parent nodes and child nodes. A parent node is a node that executes one or more tasks to generate an output that is used as an input by a child node. The child node receives output generated by a parent node as an input to execute one or more tasks. In the graph 200 of FIG. 2, the node 202 and node 203 are child nodes of the root node 201. The node 204, node 205 and node 207 are child nodes of the parent node 202. The node 205, node 209 and node 206 are child nodes of the parent node 203. The node 208 is a child node of the node 205.

In a preferred embodiment, the graph 200 may represent one or more tasks associated with performing an image processing technique on a plurality of images such as image segmentation, image classification, etc. The root node 201 may receive an image or a part of image as an input, the image may traverse through each node of the graph, which process the image to generate one or more output images at final nodes of the graph such as nodes 207, 208 and 209. Each node or a group of nodes of the graph may correspond to an image processing operation, for example, smoothing, shading, classification, segmentation, edge detection and the like. In this embodiment, the part of an image may be a slice of the image of size 8×8, preferably comprising 8 rows of pixels and 8 columns of pixels of an image. In this embodiment, each node of the graph may receive one or more slices of an image as input for processing a thread associated with the node and may generate one or more slices of image as an output.

The thread scheduler 106 identifies a plurality of stages of the graph 200, which may be parent stages and child stages based on their dependency. The thread scheduler 106 identifies a plurality of parent nodes of the parent stages and a plurality of child nodes of the child stages. In the example graph 200 of FIG. 2, the thread scheduler 106 identifies stage 1 including node 201, stage 2 including nodes 202, and 203, stage 3 including nodes 204, 205 and 206 and stage 4 including nodes 207, 208 and 209. It is evident from the FIG. 2 that the threads of nodes 202 and 203 can only be executed after the execution of the threads of node 201 and hence stage 1 is a parent stage and stage 2 is a child stage. Further, node 201 is a parent node for the nodes 202 and 203. Similarly, stage 2 is a parent stage for stage 3 and stage 4. Hence, nodes 202 and 203 act as parent nodes for the child nodes 204, 205, 206, 207 and 209. Nodes 204 and 206 also act as parent nodes for the nodes 207, and 209. Thus, the thread scheduler 106 identifies parent stages and child stages and further identifies parent nodes and child nodes.

The thread scheduler 106 further decomposes one or more operations associated with each node of the graph into one or more threads for execution. In some embodiments, the thread scheduler 106 may decompose the operations of a node into a plurality of threads such that each thread corresponds to generate an output data unit. The thread scheduler 106 determines a sequence of execution of threads based on their dependencies. For example, the thread scheduler 106 schedules threads of nodes in the following sequence:
1. 201
2. 202 and 203
3. 204, 205, and 206
4. 207, 208 and 209 based on their dependencies.

Further, the thread scheduler 106 may enable dispatching and parallel execution of the threads of a pair of parent and child nodes. The thread scheduler 106 dispatches a thread of the parent node, detects execution of the thread and generation of at least one data unit upon the execution.

The thread scheduler 106 detects if a minimum amount of data required to execute at least one thread of the child node is available. Upon confirming the availability, the thread scheduler 106 dispatches the threads of the child node even before completing execution of all the threads of the parent node. Once the child node consumes the minimum amount of data, for example one data unit, the thread scheduler 106 detects the consumption of the minimum amount of data and schedules further threads of the parent node. If the thread scheduler 106 detects that the minimum amount of data has not been generated by the thread of the parent node, the thread scheduler 106 dispatches further threads of the parent node. Thus, the thread scheduler enables parallel execution of the threads of the parent nodes as well as child nodes of the graph 200.

In the above example, the thread scheduler 106 dispatches threads of nodes 201, 202 and 203 in parallel. In this example, the thread scheduler 106 dispatches a thread of the node 201, detects execution of the thread and generation of at least one data unit upon the execution. Further, the thread scheduler 106 determines a minimum amount of data required to execute at least one thread of the child nodes 202 and 203 and dispatches the threads of the child nodes 202 and 203 even before completing execution of all the threads of the parent node 201. Once the child nodes 202 and 203 consume the data unit, the thread scheduler 106 detects the consumption of the data unit and schedules further threads of the parent node 201. Thus, the thread scheduler enables parallel execution of the threads of the parent nodes as well as child nodes of the graph.

In some embodiments, the thread scheduler 106 may group threads associated with one or more nodes to dispatch them to a first processor array 102 or the second processor 104.

Referring back to FIG. 1, the thread scheduler 106 may also assess a type of processing, also referred as an operation, required for execution of each thread and maps the thread to the first processor array 102 or the second processor 104. The thread scheduler 106 determines the type of processing based on predefined processing information associated with the thread. The predefined processing information may be one or more operations that can be executed by the first processor array 102 and the second processor 104. The predefined processing information of the second processor 104 may include, but not limited to, 1×1 convolution, 3×3 convolution, matrix multiplication, and depth wise convolution operations. The predefined processing information of the first processor array 102 may include, but not limited to, 5×5 convolution operations and sigmoid functions.

The thread scheduler 106 determines if an operation associated with a thread of a node can be performed by the second processor 104 by comparing the operation with predefined processing information of the second processor 104. The thread scheduler 106 compares the operation associated with a thread of a node with the predefined processing information of the second processor 104. The thread scheduler 106 determines as to whether the operation matches with any of the operations of the predefined processing information of the second processor 104. If the operation matches with any operation of the predefined processing information of the second processor 104, the thread scheduler 106 determines that the operation can be performed by the second processor array 104. For example, if the operation associated with the thread is a 3×3 convolution operation, the thread scheduler 106 determines that the second processor 104 can perform the operation. If the operation does not match with any operation of the predefined processing information of the second processor 104, the thread scheduler 106 determines that the operation cannot be performed by the second processor array 104. In another example, if the operation associated with the thread is a 5×5 convolution operation, the thread scheduler 106 determines that the second processor 104 cannot perform the operation.

Based on a determination that the operation can be performed by the second processor 104, the thread scheduler 106 maps the thread to the second processor 104. Alternatively, if the thread scheduler 106 determines that the operation associated with the thread cannot be performed by the second processor 104, the thread scheduler 106 compares the operation with the predefined processing information of the first processor array 102. The thread scheduler 106 maps the thread to the first processor array 102, upon determining that the operation corresponds to the predefined processing information of the first processor array 102. The thread scheduler 106 may store the mapping of each thread with the first processor array 102 or the second processor 104 in the memory associated with the thread scheduler 106 or a memory of the compiler. In one example, the thread scheduler 106 may store the mapping in the form of a mapping table. Thus, the thread scheduler 106 may dispatch threads to the first processor array 102 or the second processor 104 based on a type of processing required for execution of the threads.

The thread scheduler 106 also determines an availability of input data required to execute each thread. The thread scheduler 106 also determines whether a predefined threshold buffer size is available on a private data buffer, of the second processor 104, which will be further explained in detail below. The thread scheduler 106 based on the sequence of threads, mapping, availability of input data and the predefined threshold buffer size of the private data buffer, dispatches one or more threads to the first processor array 102 and second processor 104. The predefined threshold buffer size indicates a minimum amount of memory required to store minimum output data generated by execution of at least one thread of a node. The thread scheduler 106 may also include states of input buffers and states of output buffers associated with a thread while dispatching the thread to the first processor array 102 or the second processor 104. The states of the input buffers, also referred herein as input states, indicate a location in the memory where input data required for the execution of the thread is stored. The states of the output buffers states of output buffers, also referred to as output states, indicate a location in the memory where output data needs to be stored. The memory may include shared memory 108 or the private data buffer of the second processor 104. The input states may include, but not limited to, a type of the input buffer such as two-dimensional, three-dimensional, width and height of the input buffer, where the input data is stored. In one embodiment, the input buffers may be located in a memory 109 within or external to the graph streaming processing system 100.

Figure 3:
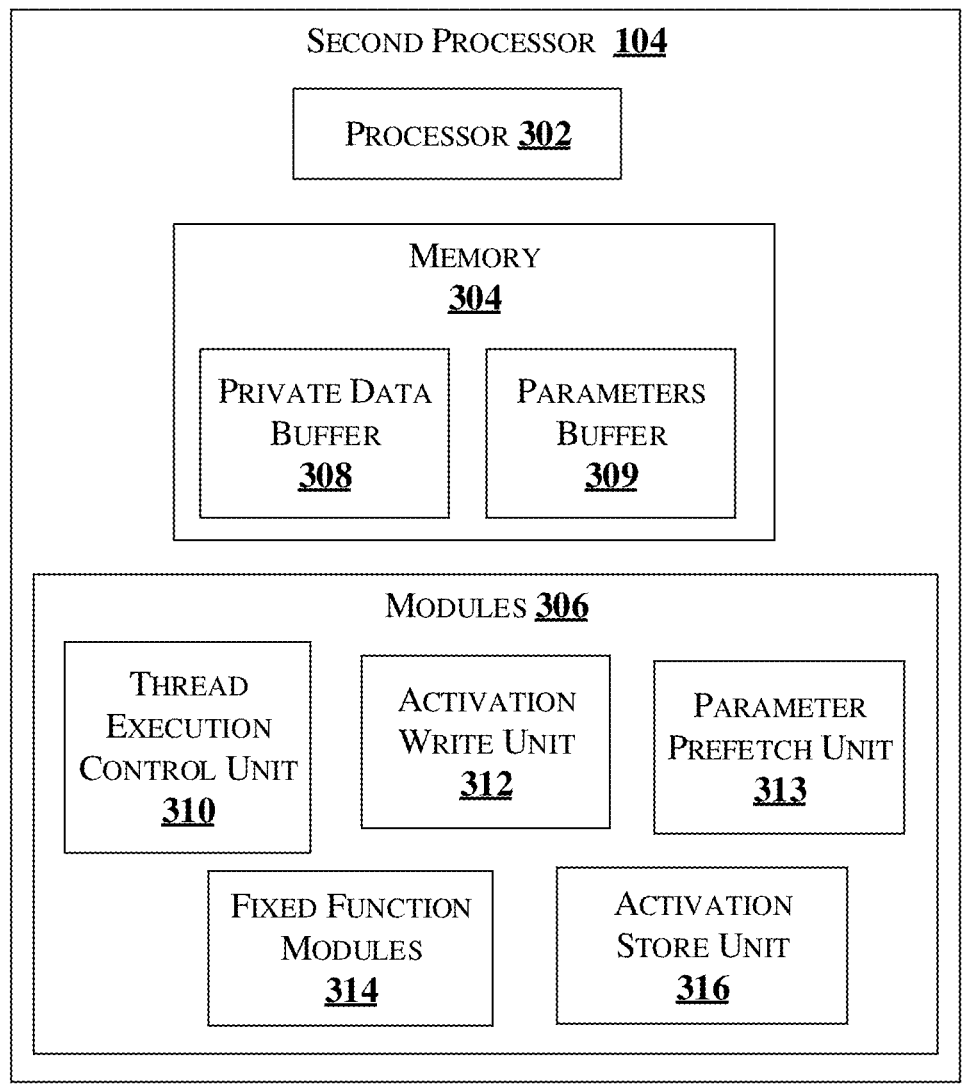
FIG. 3 illustrates an architecture of a second processor in accordance with some embodiments of the present disclosure.

The output states may include information about where the output data needs to be stored upon execution of the thread, such as the shared data buffer 108 or private data buffer 308 of the second processor 104 (shown in FIG. 3). For example, the output states may include a bit indicating "0" if the output data needs to be stored in the shared data buffer 108 and a bit "1" if the output data needs to be stored into the private data buffer 308 of the second processor 104. The output states may be assigned by the thread scheduler 106 while mapping each thread to either the first processor array 102 or the second processor 104. In one embodiment, the thread scheduler 106 may map a current thread to the second processor 104 and a subsequent thread, that depends on the current thread to the first processor array 102. In this embodiment, the thread scheduler 106 may set a value for the output states bit, corresponding to the current thread, indicating that the output data needs to be stored in the private data buffer 308 of the second processor 104. This enables the subsequent thread to read input data from the private data buffer 308 thereby reducing time required to fetch data from the shared data buffer 108. In another embodiment, the thread scheduler 106 may map a current thread to the first processor array 102 and a subsequent thread, that depends on the current thread to the second processor 104. In this embodiment, the thread scheduler 106 may set a value for the output states bit, corresponding to the current thread, indicating that the output data needs to be stored in the shared data buffer 108.

As shown in FIG. 1, the thread scheduler 106 identifies a thread at step 110 mapped to the first processor array 102, dispatches the thread to the first processor array 102 including information about states of buffers associated with the thread. The first processor array 102 receives the thread and the states of buffers. The first processor array 102 determines input data required to execute the thread. The first processor array 102 receives the thread and fetches input data required to execute the thread from the memory 109 if the thread is the first thread of the graph. If the thread is not the first thread, the first processor array 102 reads input data, at step 114, required to execute the thread from the shared data buffer 108 using the read interface of the shared data buffer 108. The input data may be at least one data unit such as, without limiting to, an image or a slice of an image or a plurality of slices of an image required to execute the thread. In a preferred embodiment, a data unit is a slice of an image. The first processor array 102 may execute the thread and may generate output data comprising at least one data unit.

The first processor array 102 may write the output data into the shared data buffer 108 at step 116 using the write interface of the shared data buffer 108 based on the output states, that indicate that a subsequent thread dependent on the thread will be dispatched to the first processor array 102. In some embodiments, the first processor array 102 may also write the output data into the private data buffer 308 of the second processor 104, as indicated by step 118, using a write interface of the second processor 104, based on the output states, that indicate that the subsequent thread will be dispatched to the second processor 104. The procedure of writing data into the private data buffer 308 of the second processor 104 is explained in detail further below with the help of FIG. 3. The first processor array 102 further retires the thread and sends thread retire events to the thread scheduler 106 at step 120. The thread scheduler 106 receives the thread retire events from the first processor array 102 and determines that the thread dispatched to the first processor array 102 has been executed.

In some embodiments, the first processor array 102 writes the output data into the private data buffer 308, upon determination that the subsequent thread is being dispatched to the second processor 104. In some embodiments, the first processor array 102 writes the output data into the shared data buffer 108, upon determination that the subsequent thread is being dispatched to the first processor array 102. In some embodiments, the first processor array 102 writes the output data into the shared data buffer 108 as well as the private data buffer 308, upon determining that subsequent threads are being dispatched to the first processor array 102 and the second processor 104.

The thread scheduler 106 identifies a thread mapped to the second processor 104 and dispatches the thread at step 112 to the second processor 104. The second processor 104 receives the thread and determines input data required to execute the thread. The second processor 104 reads input data required to execute the thread from the main memory 109 if the thread is the first thread of the graph. If the thread is not the first thread, the second processor 104 reads input data, at step 122, required to execute the thread from the shared data buffer 108 using the read interface of the shared data buffer 108. The input data may comprise at least a data unit generated by its previous threads. The second processor 104 may execute the thread and may generate output data such as one or more data units.

The second processor 104 may write the output data into the private data buffer 308 of the second processor 104, based on the output states, that indicate that a subsequent thread dependent on the thread will be dispatched to the first processor array 102. In some embodiments, the second processor 104 may also write the output data into the shared data buffer 108 at step 124 using the write interface of the shared data buffer 108, based on the output states, that indicate that a subsequent thread dependent on the thread 112 will be dispatched to the second processor 104. In some embodiments, the second processor 104 writes the output data into the shared data buffer 108 as well as the private data buffer 308, upon determining that subsequent threads are being dispatched to the first processor array 102 and the second processor 104. The second processor 104 further retires the thread and sends thread retire events to thread scheduler 106 at step 126. The thread scheduler 106 receives the thread retire events from the second processor 104 and determines that the thread dispatched to the second processor 104 has been executed.

FIG. 3 illustrates an architecture of the second processor 104 in accordance with some embodiments of the present disclosure.

The second processor 104 comprises a processor 302, a memory 304 and one or more modules 306 to perform operations associated with neural networks. The processor 302 may be a general-purpose processor, an array of processors, an application specific processor, a field programmable gate array and the like. The memory 304 may be a volatile memory or a non-volatile memory. The memory 304 comprises at least the private data buffer 308 and a parameters buffer 309 309. The one or more modules 306 may comprise a thread execution control unit 310, an activation write unit 312, a parameter prefetch unit 313, fixed function modules 314 and activation write unit 316. In some embodiments, the processor 302 may comprise the modules 306.

The thread execution control unit 310 is configured to execute one or more threads dispatched by the thread scheduler 106 to the second processor 104, for example, one or more threads at step 112 and send thread retire events at step 126 to the thread scheduler 106. The thread execution control unit 310 may be interfaced with the thread scheduler 106 for receiving the one or more threads at step 112 dispatched to the second processor and initiates processing of the one or more threads at step 112. The thread execution control unit 310 may be coupled with the private data buffer 308 for initiating the processing of the threads at step 112. The thread execution control unit 310 tracks execution status of each thread of the threads at step 112. The thread execution status may be any of fetching input data, execution, writing the output data and the like. The thread execution control unit 310 determines that execution status of a thread is completed and may send thread retire event at 126 to the thread scheduler 106 indicating that the thread has completed its execution.

The activation write unit 312 is coupled with the first processor array 102 for enabling first processor array 102 to write data into the private data buffer 308. The activation write unit 312 receives data, such as a data unit from the first processor array 102 and writes the data into the private data buffer 308. The activation write unit 312 may receive the data upon execution of a thread by the first processor array 102. The first processor array 102 may execute a thread and may generate an output data comprising at least one data unit. The first processor array 102 determines that a subsequent thread dependent on the executed thread is mapped to the second processor 104, for example, based on the output states. The first processor array 102 may then write the generated output data into the private data buffer 308 of the second processor 104 through the activation write unit 312, instead of writing it into the shared data buffer 108. When the second processor 104 executes the subsequent thread, the second processor 104 may fetch the generated output data from the private data buffer 308, which consumes less time, instead of fetching from the shared data buffer 108, which consumes more time. Thus, the activation write unit 312 optimizes an amount of time required for the second processor 104 to fetch data from the shared data buffer 108 by enabling first processor array 102 to write data into private data buffer 308.

The parameter prefetch unit 313 may receive a thread initiation instruction of a thread from the thread execution unit 310 and fetch states from the memory 109 required for execution of the thread. The parameter prefetch unit 313 may be interfaced with the shared data buffer 108 with read interfaces. The parameters may be any of weights, biases and scales associated with one or more neural network operations related to the thread. The parameter prefetch unit 313 retrieves states of the parameters and the parameters required to execute the thread from the memory 109. The parameter prefetch unit 313 is coupled with a parameters buffer 309, stored in memory 304. The parameter prefetch unit 313 writes the parameters fetched from the memory 109 into the parameters buffer 309. The parameters buffer 309 is a circular buffer of a predetermined length. The predetermined length may be determined based on a depth of the private data buffer 308 and a depth of an input chunk.

The parameter prefetch unit 313 may determine if all the parameters required to generate an output chunk of data have been fetched and also determine if there is still space available in the parameters buffer 309 to store further parameters required to generate further chunks of data. The parameter prefetch unit 313 may prefetch other parameters required to generate a further chunk of output data and store into the parameters buffer 309. The parameters buffer 309 may be coupled with the vector convolution datapath units for execution of the thread. For example, as shown in FIG. 4b, the parameters buffer 309 may store the parameters $W_{k,0}$ to $W_{k,D-1}$ required to generate an output chunk-k of data. In this example, the parameters buffer 309 discards the parameters $W_{k,0}$ to $W_{k,D-1}$ once the output chunk is generated. The parameter prefetch unit 313 may prefetch $W_{k+1,0}$ to $W_{k+1,D-1}$ parameters required to generate a further output chunk-(k+1) of data during the generation of the output chunk-k and when a required amount of memory to store the $W_{k+1,0}$ to $W_{k+1,D-1}$ parameters is available in the parameters buffer 309.

The private data buffer 308 may comprise one or more three-dimensional buffers to store data generated by the first processor array 102 or the second processor 104. In an embodiment, each three-dimensional buffer, also referred herein as an activation data buffer, comprises a portion of memory for storing one or more outputs generated by the second processor 104 or the first processor array 102. Each activation data buffer may store the outputs generated in the form of slices. In one example, each slice may be 8 rows in height and 8 planes in depth, such as 8 rows of pixels. Each slice may be represented as a plurality of chunks, which is further represented as a number of blocks. A detailed analysis of storing each slice in the private data buffer 308 is discussed in detail with the help of FIG. 4a below.

Figure 4A:
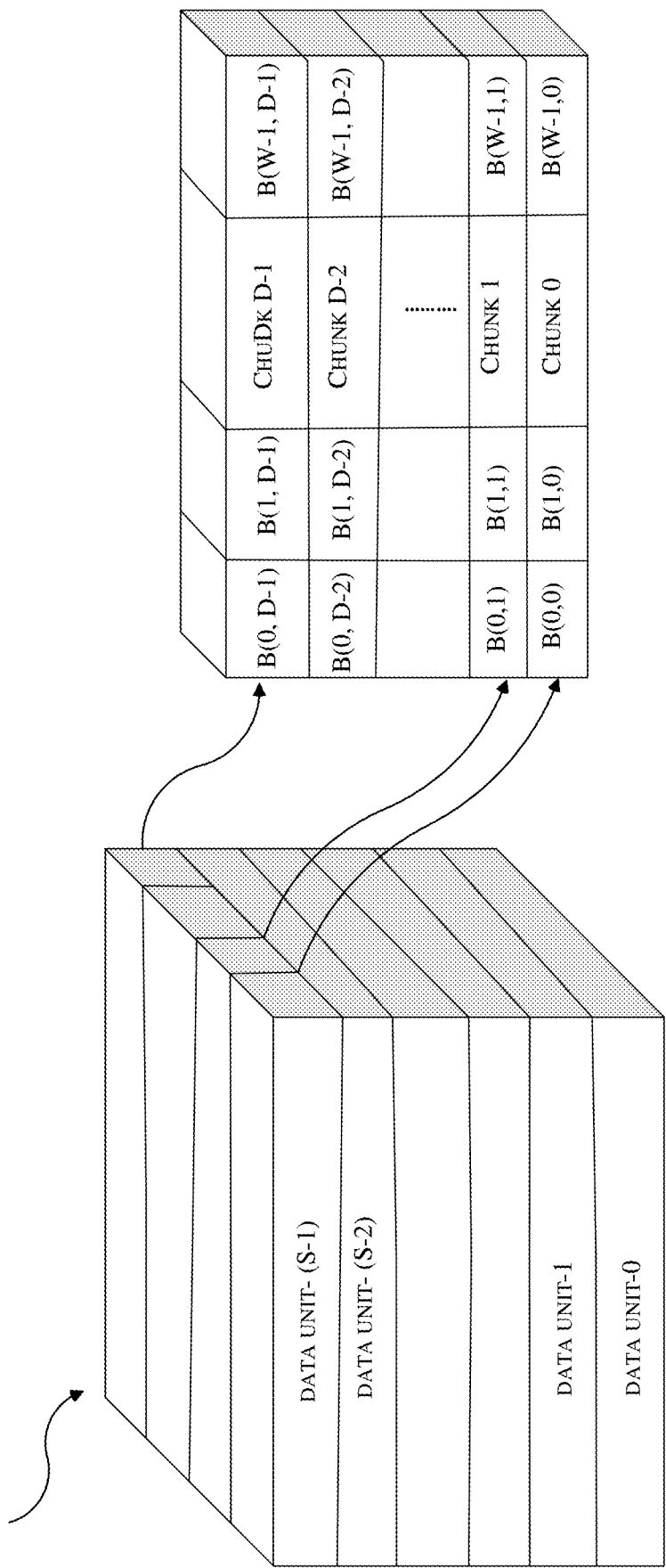
FIG. 4a illustrates a perspective view of a private data buffer associated with the second processor in accordance with an embodiment of the present disclosure.
Figure 4B:
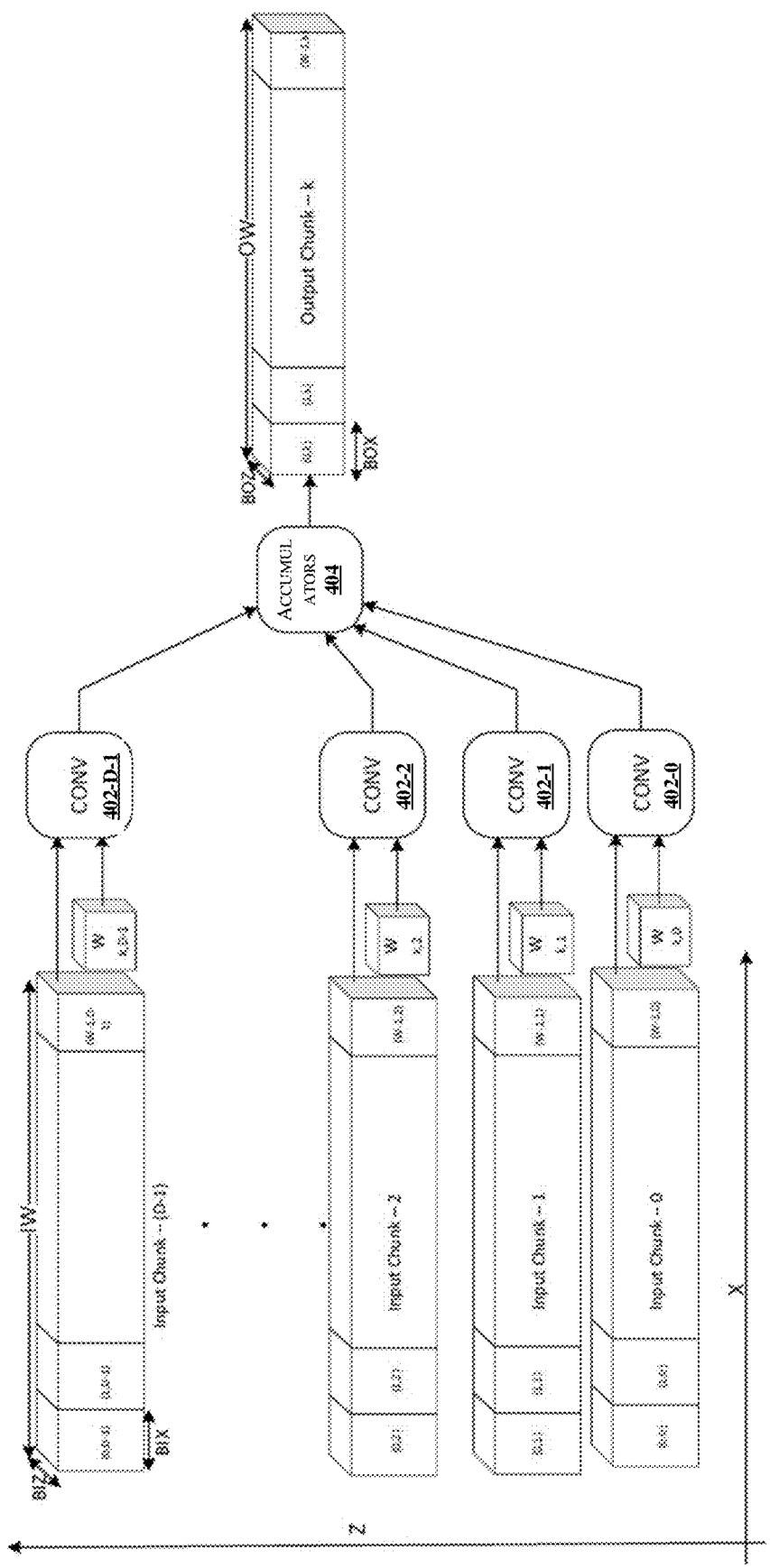
FIG. 4b illustrates the operation of fixed function modules of the second processor in accordance with embodiments of the present disclosure.

FIG. 4a illustrates a decomposed view of the private data buffer 308 in accordance with an embodiment of the present disclosure.

The private data buffer 308 comprises a plurality of data units data unit-0, data unit-1, . . . data unit (S-2) and data unit (S-1), where S may be a maximum number of data units that can be stored within the private data buffer 308. Each data unit may be decomposed into a plurality of chunks chunk-0, chunk-1, . . . . Chunk (D−2) and chunk (D−1), where D is a depth of the private data buffer 308 and represents a total number of chunks present within each data unit. Each chunk may further be decomposed into a plurality of blocks for example, B(0,0), B(1,0), . . . B(W−1, 0) in chunk-0. Here, 'W' may indicate a plurality of parameters or weights required to calculate a chunk of output data. In some embodiments, there may be a plurality of private data buffers 308 in the memory 304 for implementing an input data buffer and an output data buffer for each pair of a parent stage and a child stage of the graph.

Referring back to FIG. 3, the fixed function modules 314 may comprise activation multiplexers, vector convolution data path units, accumulators, and a quantization and second stage operations unit.

The activation multiplexers of the fixed function modules 314, also referred herein as activation MUXes, may generate one or more blocks of input data required to perform one or more neural network operations. The activation MUXes may be implemented using hardware multiplexers or in software. The activation MUXes receive input data required for the one or more neural network operations such as one or more data units of image from the private data buffer 308. The activation MUXes generate input data required for vector convolution datapath units for the one or more neural network operations such as chunks of data. In one embodiment, the activation MUXes may generate a chunk of data or an input chunk required for the one or more neural network operations. In another example, the activation MUXes generate a block of 8×10×10 pixels as input data for 3×3 convolution operation. In another example, the activation MUXes generate a block of 8×17×17 pixels as input data for 3×3 convolution stride 2 operation. In yet another example, the activation MUXes generate a block of 32×8×8 pixels as input data for 1×1 convolution operation.

The vector convolution datapath units may receive the input data generated by the activation MUXes, a plurality of weights from the parameters buffer 309 and may perform the one or more neural network operations. In one embodiment, the vector convolution datapath units, also referred herein as convolution units, may receive a block of input data from the activation MUXes, a block of weights, may perform convolution dot product operations and may generate a block or a plurality of blocks of output data. The operation of the convolution units may be herein explained using the FIG. 4b below.

FIG. 4b illustrates the operation of the convolution units of the fixed function modules 314 in accordance with embodiments of the present disclosure.

As shown in FIG. 4b, the convolution units 402-0,402-1,402-2, . . . 402-(D−1), together represented as the convolution units 402. The input chunks, namely input chunk-0, input chunk-1, input chunk-2, . . . input chunk (D−1), represent the input data generated by the activation MUXes. Each input chunk may comprise "W" blocks from 0 to W−1. Each block is of a length of BIX, and depth of BIZ, where BIX and BIZ are any number of pixels. The parameters $W_{k,0}$, $W_{k,1}$, . . . , $W_{k,D-1}$ may represent the plurality of weights retrieved from the parameters buffer 309. Each convolution unit 402-0,402-1, . . . ,402-(D−1) may receive the input chunks input chunk-0, input chunk-1, . . . input chunk-(D−1), and the weights $W_{k,0}$, $W_{k,1}$ . . . , $W_{k,D-1}$ and performs convolution operations as shown in FIG. 4b to generate an output chunk-k. For example, a block of the input chunk-0 is convolved with the weight $W_{k,0}$ by the convolution unit 402-0, a block of input chunk-1 is convolved with weight $W_{k,0}$ by the convolution unit 402-1, . . . and a block of the input chunk-(D−1) is convolved with the weight $W_{k,D-1}$ by convolution unit 402-(D−1) to generate an output chunk-k. Each output chunk-k is of length OW, and a depth of BOZ.

Referring back to FIG. 3, in an embodiment, the convolution units may operate in a 3×3 convolution mode when the neural network operation is the 3×3 convolution operation. In this mode, the second processor 104 may comprise at least four convolution units, where each convolution unit receives a block of activation data, a block of weights and performs the 3×3 convolution operation to generate partial output activation data. For example, in this mode, each convolution unit may receive 8×4×10 input data, 16×8×3×3 blocks of weights and generates 16×2×8 partial output data.

In another embodiment, the convolution units may operate in 3×3 convolution stride 2 mode, wherein the second processor 104 comprises at least four convolution units. In this embodiment, each convolution unit receives a block of activation data, a block of weights and performs the 3×3 convolution stride 2 operation to generate partial output activation data. For example, in this mode, each convolution unit may receive 8×5×17 input data, 16×8×3×3 blocks of weights and generates 16×2×8 partial output data. In a further embodiment, the convolution units may operate in 1×1 convolution mode, wherein the second processor 104 comprises at least four convolution units. In this embodiment, each convolution unit receives a block of activation data, a block of weights and performs the 1×1 convolution operation to generate partial output activation data. For example, in this mode, each convolution unit receives 32×2×8 input data, 32×32×1×1 blocks of weights and generates 32×2×8 partial output activation data. In some embodiments, the convolution units may require at least three data units of input data to execute a thread and generate at least an output data unit.

The accumulators 404 may receive the partial output data from the convolution units and may accumulate them to generate an output block of data. For example, as shown in FIG. 4b, the accumulators 404 may receive outputs from the convolution units 402-0 . . . 402-(D−1) and accumulate the outputs of all the convolution units 402 to generate the output block-(0.0). The accumulators 404 may be an accumulation unit within a processor that is configured to accumulate data.

The quantization and second stage operations unit may receive the output block from the accumulators and may perform second stage operations on the output block. The second stage operations include, but not limited to, batch normalization, rectified linear unit, leaky rectified linear unit, and binary summation. In some embodiments, the second stage operations may also be referred to as node fusion operations, since convolution nodes such as 1×1 convolution, 3×3 convolution and 3×3 convolution stride 2 operation, are fused with the nodes associated with second stage operations and may perform the operations on the output data from the convolution nodes. The quantization and second stage operations unit may be any processor such as a general-purpose processor, application specific IC, FPGA, a microcontroller or a microprocessor configured to perform the second stage operations.

The activation store unit 316 may receive the output data, for example, a block, from the quantization and second stage operations unit and may store the output data in the private data buffer 308 or the shared data buffer 108 or both based on the output states of the current thread. Thus, the activation store unit 316 enables the second processor 104 to access data from the private data buffer 308 rather than fetching input data from the memory subsystem thus reducing the time required for the second processor 104 to fetch data from the shared data buffer 108.

In operation, the second processor 104 may receive a thread, corresponding to a current node, for example, 202, dispatched by the thread scheduler 106. The thread execution control unit 310 may receive the thread and may initiate execution of the thread. The thread execution control unit 310 may communicate with the parameter prefetch unit 313 to fetch a plurality of weights from the memory 109 and store in the parameters buffer 309. The thread execution control unit 310 may communicate with the private data buffer 308 to fetch input data required to execute the thread. The parameter prefetch unit 313 may then fetch weights from the parameters buffer 309 to execute the thread. The activation MUXes may receive input data from the private data buffer 308 and may generate a predetermined number of chunks of data required for the convolution units to execute the thread.

The convolution units may receive the predetermined number of chunks of data from the activation MUXes and weights from the parameters buffer 309 to perform one or more operations such as 1×1 convolution operation associated with the thread. The convolution units may generate partial output data that is received by the accumulators to accumulate a block of output chunk. The quantization and second stage operations unit receives the block of data accumulated by the accumulators and performs one or more second stage operations on the output block of data. The activation store unit 316 receives this output block of data and may store either in the shared data buffer 108 or the private data buffer 308 or both based on the output states. The thread execution control unit 310 may determine that the status of the thread is "writing results" and may wait till the status is "complete". The convolution units continue to generate further plurality of blocks of data to generate an output chunk and further an output data unit. The thread execution control unit 310 may determine at this stage that the status of the thread is complete since an output data unit has been generated by the second processor 104. The thread execution control unit 310 may initiate thread retire event for the current thread and may communicate the thread retire event of the current thread to the thread scheduler 106.

Figure 5:
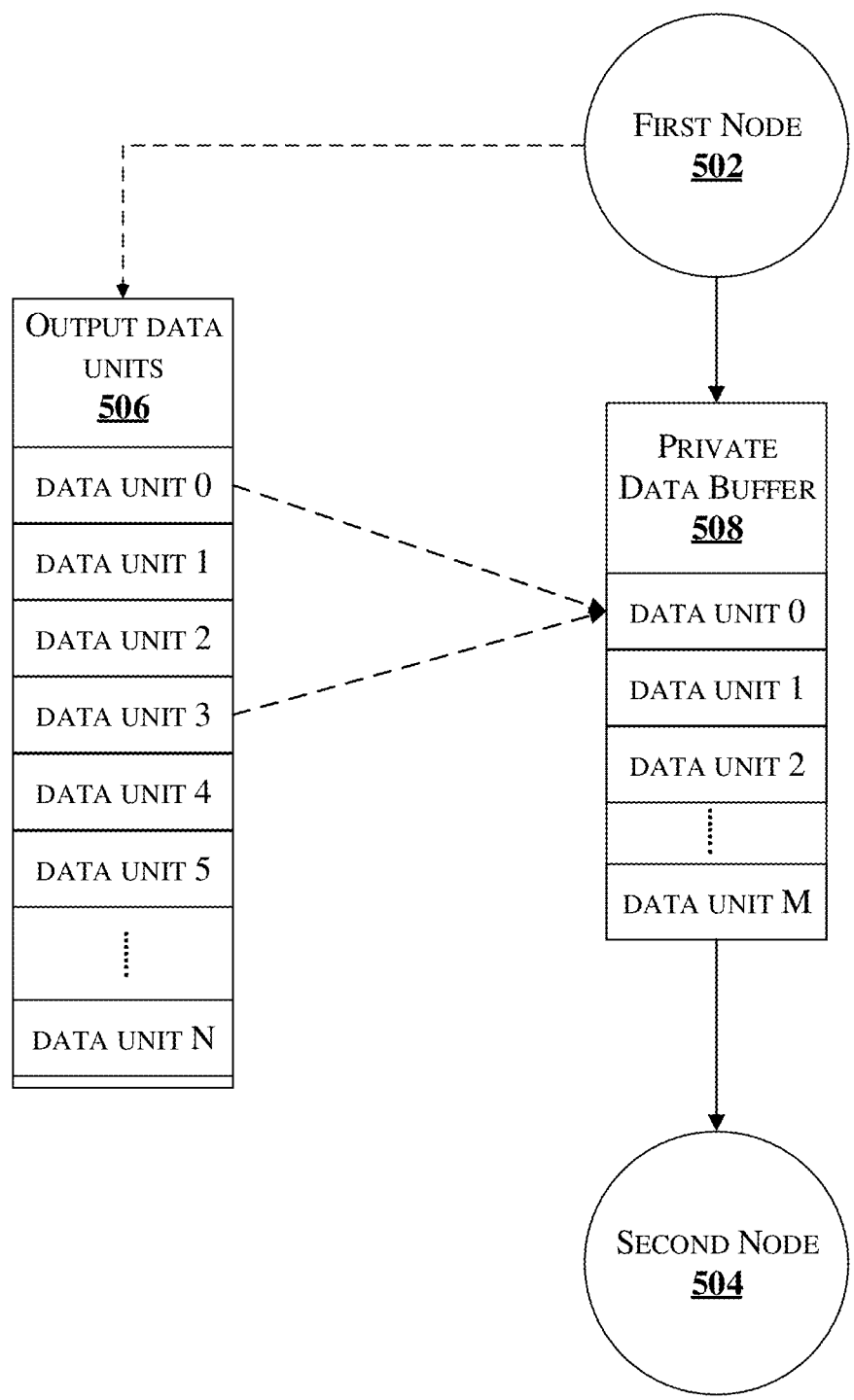
FIG. 5 illustrates an operation associated with private data buffer in accordance with some embodiments of the present disclosure.

FIG. 5 illustrates an operation associated with the private data buffer 308 in accordance with some embodiments of the present disclosure.

The private data buffer 308 is associated with a pair of a parent node and a child node of the graph. The threads of the parent node, upon execution, generate data and write the output data into the private data buffer 308. The threads of the child node read the data generated by the parent node from the private data buffer 308, as input for execution. While the thread scheduler 106 dispatches threads of the parent nodes and child nodes in parallel, there may be a possibility to overwrite the data in the private data buffer 308 even before the threads of the second node consume the data. Hence, the present disclosure propose a design and management method of the private data buffer 308 to avoid any such overwriting and to ensure consumption of data before overwriting the data. The details of the design of the private data buffer 308 is explained with the help of FIG. 5 below.

The private data buffer 308 of FIG. 3 may comprise a number of data buffers to store output data units generated by each node of the graph, for example, 200 of FIG. 2. Each node of the graph may be associated with at least one input data buffer and at least one output data buffer.

In some embodiments, the output data buffer of a node may serve as an input data buffer of another node. For example, the output data buffer of node 202 may serve as input data buffer of nodes 204, 207 and 205. In some other embodiments, a node may correspond to a plurality of input data buffers. For example, the node 205 may be associated with two input data buffers such as the output data buffer of node 202 and the output data buffer of node 203. Each node upon execution of a thread corresponding to the node may receive input data from the input data buffer associated with the node and may write output data into the output data buffer associated with the node.

To this end, consider a first node 502 which may be a parent node for example, node 202 of FIG. 2 and a second node 504 which may be a child node for example, nodes 204, 207 or 205 of FIG. 2. The output data buffer of the first node 502 may serve as the input data buffer of the second node 504. The first node 502 may generate N number of data units 506 upon execution of one or more threads associated with the first node 502, represented as a dotted line between the first node 502 and the output data units 506 in FIG. 5. Some of these data units may be consumed by the second node 504 as and when they are generated by the first node 502. The output data buffer that stores the output data units of the first node 502 may be referred to as a private data buffer 508, which enables wrapping or segregating of data units upon consumption of data units by the second node 504.

The private data buffer 508 may comprise memory required to store a predetermined number of data units, M, segregated from a number of data units. The predetermined number M may be determined based on a minimum number of data units required to execute a thread of the second node 504 or a type of convolution operation. In one example, the minimum number of data units required to execute a thread of the second node 504 is three data units and hence the private data buffer 508 comprises memory required to store three data units. In another example, the minimum number of data units required is three data units since a convolution 3×3 operation requires at least 3 data units as input for execution.

The private data buffer 508 may store M data units generated by the first node 502. Further, the second node 504 may start execution and may consume at least one data unit for example, data unit 0 of the private data buffer 508. The thread scheduler 106 may detect that at least one data unit has been consumed by the second node 504 and may allow writing the next most data unit into the memory of the at least one data unit for example, data unit 0 of the private data buffer 508. Further, the second node 504 may execute a further thread that consumes at least another data unit for example, data unit 1. The thread scheduler 106 may detect that at least another data unit has been consumed by the second node 504 and may allow writing the next most data unit into the memory of another data unit for example, data unit 1 of the private data buffer 508. Thus, the private data buffer 508 enables wrapping up of data units into a fixed memory corresponding to a predetermined number of data units for example, 3 data units reducing the memory required to store all the output data units generated by a node. This significantly optimizes memory required to store output data units generated by a number of nodes of a graph into memory required to store only predetermined or minimum number of data units that are required for child nodes to execute their threads. The management method of the private data buffer 508 is further explained using FIG. 6 below.

Figure 6:
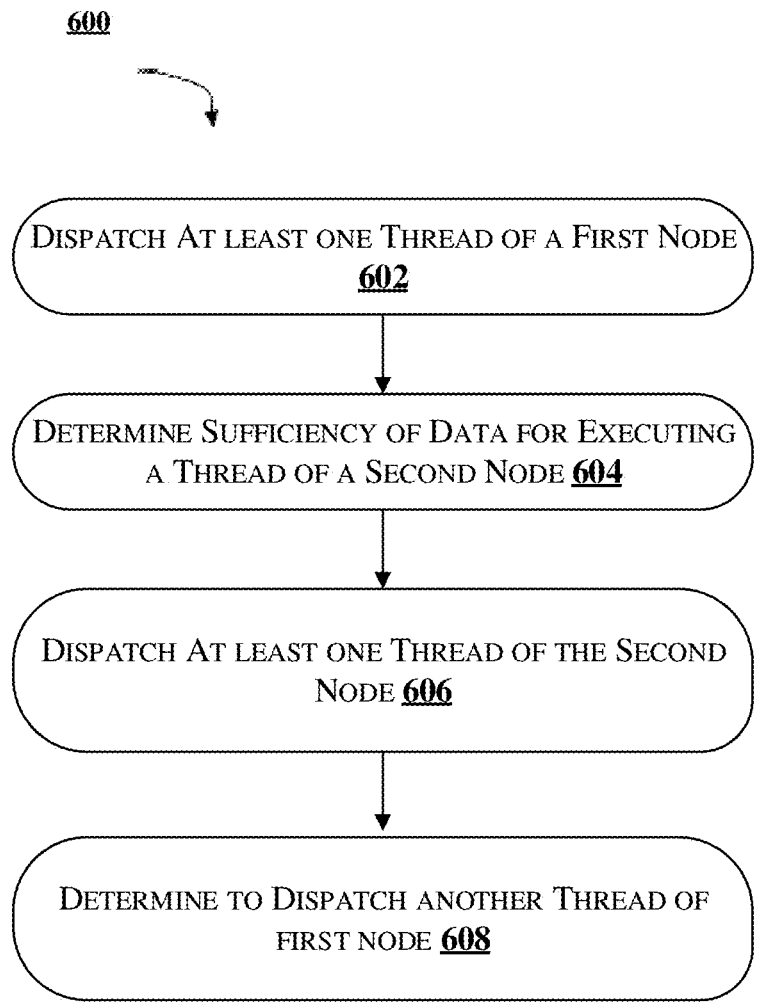
FIG. 6 illustrates a flowchart of a method performed by the thread scheduler to dispatch threads based on the availability of the private data buffer in accordance with some embodiments of the present disclosure.

FIG. 6 illustrates a flowchart of a method performed by the thread scheduler 106 to dispatch threads based on the availability of memory in private data buffer 508 in accordance with some embodiments of the present disclosure.

As illustrated in FIG. 6, the method 600 comprises one or more blocks implemented by the thread scheduler 106 to dispatch threads of a graph. The method 600 may be described in the general context of computer executable instructions. Generally, computer executable instructions can include routines, programs, objects, components, data structures, procedures, modules, and functions, which perform specific functions or implement specific abstract data types.

The order in which the method 600 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 602, the thread scheduler 106 may dispatch at least one thread associated with a first node 502. The thread scheduler 106 may identify dependent nodes of a graph for example, graph 200. The thread scheduler 106 may identify a first node 502 and a second node 504 such that execution of a plurality of threads of the second node 504 is dependent on an output data generated by execution of a plurality of threads of the first node 502. The thread scheduler 106 may identify one or more child nodes dependent on the one or more parent nodes of the graph. For example, in the graph 200 of FIG. 2, the nodes—node 202 and node 203 are child nodes of the root node 201. The thread scheduler 106 may also determine output states associated with each thread and may assign each thread to either the first processor array 102 or the second processor 104. Further, the thread scheduler may dispatch at least one thread associated with the first node 502 to one of the first processor array 102 and the second processor 104. For example, the thread scheduler 106 may dispatch a thread of the first node 502 of FIG. 5 to either the first processor array 102 or the second processor 104. The thread scheduler 106 may track the status of the thread and ensures the complete execution of the thread. The thread scheduler 106 may also determine that at least an output data unit generated by the execution of the thread has been written into the output private data buffer 508 of the first node 502 for example, private data buffer 508.

At block 604, the thread scheduler 106 may determine that data, at least one output data unit, generated by execution of the thread associated with the first node 502, is sufficient to execute at least one thread of the second node 504. The thread scheduler 106 may determine that a thread of the second node 504 requires at least (M−1) data units of data. The thread scheduler 106 further determines if all the (M−1) data units of data have been produced and written into the private data buffer 508. For example, the thread scheduler 106 determines that the second node 504 requires 2 data units of input and detects if all 2 data units have been written into the private data buffer 508. If the thread scheduler 106 determines that there is insufficient data in the private data buffer 508 or (M−1) data units of data have not been produced by the first node 502, the thread scheduler 106 dispatches further threads of the first node 502 until all the (M−1) data units have been produced and written into the private data buffer 508. In the above example, if the thread scheduler 106 determines that only 1 data unit of data is available and 1 more data unit of data is required as input, the thread scheduler 106 dispatches one thread to produce one data unit of data. Thus, the thread scheduler 106 ensures that the input data required for executing at least one thread of the second node 504 is generated and available in the private data buffer 508 before dispatching any threads of the second node 504.

At block 606, the thread scheduler 106 dispatches at least one thread of the second node 504 to either the first processor array 102 or the second processor 104, upon determining that the output data generated by the at least one thread of the first node 502 is sufficient to execute at least one thread of the second node 504. The thread scheduler 106 dispatches a thread of the second node 504 since the data required to execute the thread is available in the input private data buffer 508 of the second node 504. For example, since all the 3 data units required to execute a thread of the second node 504 are available at the private data buffer 508, the thread scheduler 106 dispatches the thread of the second node 504. The thread scheduler 106 tracks the execution of the thread such as fetching input data, execution or writing results.

At block 608, the thread scheduler 106 determines whether to dispatch at least one subsequent thread of the first node 502 for execution when a predefined threshold buffer size is available on the private data buffer 508. The thread scheduler 106 determines availability of the predefined threshold buffer size on the private data buffer 508. The predefined threshold buffer size indicates a minimum memory size required to store output data generated by executing at least one thread of a node. The predefined threshold buffer size may also be called buffer availability hereinafter. For example, execution of a thread of the first node 502 generates one data unit, data unit 0 of output data. Thus, in this example, the predefined threshold buffer size is one data unit of memory in the private data buffer 508. The thread scheduler 106 tracks a read status of the private data buffer 508 and determines if the thread of the second node 504 has read the data units written into the private data buffer 508. The thread scheduler 106 determines that the predefined threshold buffer size is available on the private data buffer 508 if at least one data unit has been consumed by the at least one thread of the second node 504 or at least one data unit of free memory is available in the private data buffer 508. The thread scheduler 106 determines that the predefined threshold buffer size is not available on the private data buffer 508 if at least one data unit of memory is not free in the private data buffer.

In one embodiment, when the threads of the first node 502 generate M data units and store in the private data buffer 508, the thread scheduler 106 determines if at least one data unit has been consumed by the threads of the second node 504. Further, the thread scheduler 106 detects if the threads of the second node 504 have consumed at least one data unit and determines that the predefined threshold buffer size is available on the private data buffer 508. On the other hand, if the thread scheduler 106 detects that the threads of the second node 504 have not consumed all the data units in the private data buffer 508, the thread scheduler 106 determines that the predefined threshold buffer size is not available.

The thread scheduler 106 determines, based on the buffer availability, that at least one data unit is consumed by the second node 504. The thread scheduler 106 thus ensures at least one data unit of memory in the private data buffer 508 is available to store an output data unit generated if a subsequent thread of the first node 502 is dispatched. The thread scheduler 106 dispatches the subsequent thread of the first node 502, is at least one data unit memory of the private data buffer 508 is available. Thus, the thread scheduler 106 cautiously avoids any overwriting of a new data unit onto an old data unit of memory which improves efficiency of thread execution as well as optimizes utilization of the private data buffer 508 only upon consumption of data units by the child node. If the thread scheduler 106 determines that the buffer availability of the private data buffer 508 is "0", the thread scheduler 106 refrains from dispatching any threads corresponding to the first node 502. The thread scheduler 106 may also consider an availability of input data required to execute subsequent thread of the first node 502 before dispatching another thread.

Thus, the present disclosure provides a design of a graph streaming neural network processing system that enables parallel processing of tasks or threads of a workflow using an optimized size of a data buffer, without overwriting the data buffer. The present disclosure also enables design and management of the data buffer to enable efficient processing and storing of data of any parent node of a data structure. The present disclosure provides a thread scheduler 106 that determines a sequence of threads not only based on data dependency or data availability of each thread, but also based on a buffer availability of the private data buffer 508 associated with a node. Also, since the private data buffer 508 enables wrapping up of data units on to consumed data units, the proposed architecture significantly optimizes memory, in terms of data units, required to store output data generated by each node of the graph. Conventionally an output buffer associated with a node of a graph may comprise memory capable of storing a number of data units, while this is reduced to only a minimum number of data units required to execute a thread of a child node. In one example, this is reduced to 3 data units of memory. Further, since the thread scheduler dispatches further threads of a parent node only when at least one data unit of memory is available in the output private data buffer 508 of the parent node, this avoids any overlap between a new data unit overwriting an old data unit.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. Accordingly, the disclosure of the embodiments of the disclosure is intended to be illustrative, but not limiting, of the scope of the disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

We claim:

1. A graph streaming processing system comprising:
A first processor array;
a second processor; and
a thread scheduler configured to:
dispatch at least one thread associated with a first node, to one of the first processor array and the second processor, to generate an output data comprising at least one data unit, wherein the at least one data unit is stored in a private data buffer of the second processor;
determine sufficiency of the at least one data unit for executing at least one thread of a second node, wherein the second node is identified to be dependent on the output data generated by execution of a plurality of threads of the first node;
dispatch the at least one thread of the second node, to one of the first processor array and the second processor, upon determining that the at least one data unit is sufficient; and
determine to dispatch at least one subsequent thread of the first node for execution when a predefined threshold buffer size is available on the private data buffer,
wherein the first processor array is configured to:
receive the at least one thread dispatched by the thread scheduler;
retrieve input data required for execution of the at least one thread from a data buffer shared between the first processor array and the second processor;
execute the at least one thread to generate the output data; and
perform at least one of:
writing the output data to a shared data buffer, upon determination that the subsequent thread, dependent on the at least one thread, is being dispatched to the first processor array, wherein the shared data buffer is a memory subsystem shared by the first processor array and the second processor; and
writing the output data into the private data buffer, upon determination that the subsequent thread is being dispatched to the second processor.

2. The graph streaming processing system as claimed in claim 1, wherein the thread scheduler dispatches the at least one thread to one of the first processor array and the second processor based on a type of processing required for execution of the at least one thread, wherein the type of processing is determined based on predefined processing information associated with the first processor array and the second processor.

3. The graph streaming processing system as claimed in claim 1, wherein the second processor comprises a write unit to enable the first processor array to write the output data into the private data buffer.

4. The graph streaming processing system as claimed in claim 1, wherein the second processor is configured to:
receive the at least one thread dispatched by the thread scheduler;
retrieve input data required for execution of the at least one thread from at least one of the shared data buffer and the private data buffer;
execute the at least one thread to generate the output data; and perform at least one of:
  writing the output data into the private data buffer, upon determination that the subsequent thread is being dispatched to the second processor; and
  writing the output data into the shared data buffer, upon determination that the subsequent thread is being dispatched to the first processor array.

5. The graph streaming processing system as claimed in claim 1, wherein the private data buffer is configured to store a predetermined number of data units segregated from a plurality of data units, wherein the data unit corresponds to a slice of the output data and wherein the predetermined number of data units is determined based a number of data units required to execute the at least one thread of the second node.

6. The graph streaming processing system as claimed in claim 1, wherein the thread scheduler determines the sufficiency of the at least one data unit for execution of the at least one thread of the second node by:
  detecting an execution of the at least one thread of the first node;
  detecting generation of the at least one data unit from the execution of the at least one thread;
  detecting storing of the at least one data unit in the private data buffer; and
  determining that the at least one data unit comprises sufficient data for execution of the at least one thread of the second node.

7. The graph streaming processing system as claimed in claim 6, wherein the thread scheduler is further configured to:
  dispatch at least one subsequent thread of the first node to generate at least one subsequent data unit, before dispatching the at least one thread of the second node for execution, upon determining that the at least one data unit comprises insufficient data for execution of the at least one thread of the second node.

8. The graph streaming processing system as claimed in claim 1, wherein to determine to dispatch the at least one subsequent thread of the first node for execution, the thread scheduler is configured to:
  detect execution of the at least one thread of the second node by consuming the at least one data unit stored in the private data buffer;
  evaluate the availability of the predefined threshold buffer size on the private data buffer; and
  perform one of:
    dispatch the at least one subsequent thread of the first node, upon determining that the predefined threshold buffer size is available; and
    dispatching at least one subsequent thread of the second node upon determining that the predefined threshold buffer size is not available.

9. A method comprising:
  dispatching, by a thread scheduler of a graph streaming processing system, one thread associated with a first node, to one of a first processor array and a second processor of the graph streaming processing system, to generate an output data comprising at least one data unit, wherein the at least one data unit is stored in a private data buffer of the second processor;
  determining, by the thread scheduler, sufficiency of at least one data unit for executing at least one thread of the second node, wherein the second node is identified to be dependent on the output data generated by execution of a plurality of threads of the first node;
  dispatching, by the thread scheduler, the at least one thread of the second node, to one of the first processor array and the second processor, upon determining that the at least one data unit is sufficient; and
  determining, by the thread scheduler, to dispatch at least one subsequent thread of the first node for execution when a predefined threshold buffer size is available on the private data buffer,
  wherein the first processor array is configured to:
    receive the at least one thread dispatched by the thread scheduler;
    retrieve input data required for execution of the at least one thread from a data buffer shared between the first processor array and the second processor;
    execute the at least one thread to generate the output data; and
    perform at least one of:
      writing the output data to a shared data buffer, upon determination that the subsequent thread, dependent on the at least one thread, is being dispatched to the first processor array, wherein the shared data buffer is a memory subsystem shared by the first processor array and the second processor; and
      writing the output data into the private data buffer, upon determination that the subsequent thread is being dispatched to the second processor.

10. The method as claimed in claim 9, wherein dispatching the at least one thread to one of the first processor array and the second processor based on a type of processing required for execution of the at least one thread, wherein the type of processing is determined based on predefined processing information associated with the first processor array and the second processor.

11. The method as claimed in claim 9, wherein determining the sufficiency of the at least one data unit for execution of the at least one thread of the second node comprises:
  detecting an execution of the at least one thread of the first node;
  detecting generation of the at least one data unit from the execution of the at least one thread;
  detecting storing of the at least one data unit in the private data buffer; and
  determining that the at least one data unit comprises sufficient data for execution of the at least one thread of the second node.

12. The method as claimed in claim 9, further comprising:
  dispatching at least one subsequent thread of the first node to generate at least one subsequent data unit, before dispatching the at least one thread of the second node for execution, upon determining that the at least one data unit comprises insufficient data for execution of the at least one thread of the second node.

13. The method as claimed in claim 9, wherein determining to dispatch the at least one subsequent thread of the first node for execution further comprises:
  detecting execution of the at least one thread of the second node by consuming the at least one data unit stored in the private data buffer;
  evaluating the availability of the predefined threshold buffer size on the private data buffer; and
  performing one of:
  dispatching the at least one subsequent thread of the first node, upon determining that the predefined threshold buffer size is available; and
  dispatching at least one subsequent thread of the second node upon determining that the predefined threshold buffer size is not available.

14. A non-transitory computer-readable medium having program instructions stored thereon, wherein the program instructions, when executed by a thread-scheduler of a graph streaming processing system, facilitate:
- dispatching, by a thread scheduler of a graph streaming processing system, one thread associated with a first node, to one of a first processor array and a second processor of the graph streaming processing system, to generate an output data comprising at least one data unit, wherein the at least one data unit is stored in a private data buffer of the second processor;
- determining, by the thread scheduler, sufficiency of at least one data unit for executing at least one thread of the second node, wherein the second node is identified to be dependent on the output data generated by execution of a plurality of threads of the first node;
- dispatching, by the thread scheduler, the at least one thread of the second node, to one of the first processor array and the second processor, upon determining that the at least one data unit is sufficient; and
- determining, by the thread scheduler, to dispatch at least one subsequent thread of the first node for execution when a predefined threshold buffer size is available on the private data buffer,
- wherein the first processor array is configured to:
  - receive the at least one thread dispatched by the thread scheduler;
  - retrieve input data required for execution of the at least one thread from a data buffer shared between the first processor array and the second processor;
  - execute the at least one thread to generate the output data; and
  - perform at least one of:
    - writing the output data to a shared data buffer, upon determination that the subsequent thread, dependent on the at least one thread, is being dispatched to the first processor array, wherein the shared data buffer is a memory subsystem shared by the first processor array and the second processor; and
    - writing the output data into the private data buffer, upon determination that the subsequent thread is being dispatched to the second processor.

15. The non-transitory computer-readable medium as claimed in claim 14, wherein the program instructions further facilitate:
- dispatching the at least one thread to one of the first processor array and the second processor based on a type of processing required for execution of the at least one thread, wherein the type of processing is determined based on predefined processing information associated with the first processor array and the second processor.

16. The non-transitory computer-readable medium as claimed in claim 14, wherein the program instructions configured to determine the sufficiency of the at least one data unit further facilitate:
- detecting an execution of the at least one thread of the first node;
- detecting generation of the at least one data unit from the execution of the at least one thread;
- detecting storing of the at least one data unit in the private data buffer; and
- determining that the at least one data unit comprises sufficient data for execution of the at least one thread of the second node.

17. The non-transitory computer-readable medium as claimed in claim 14, wherein the program instructions further facilitate:
- dispatching at least one subsequent thread of the first node to generate at least one subsequent data unit, before dispatching the at least one thread of the second node for execution, upon determining that the at least one data unit comprises insufficient data for execution of the at least one thread of the second node.

18. The non-transitory computer-readable medium as claimed in claim 14, wherein the program instructions configured to determine to dispatch the at least one subsequent thread of the first node further facilitate:
- detecting execution of the at least one thread of the second node by consuming the at least one data unit stored in the private data buffer;
- evaluating the availability of the predefined threshold buffer size on the private data buffer; and
- performing one of:
- dispatching the at least one subsequent thread of the first node, upon determining that the predefined threshold buffer size is available; and
- dispatching at least one subsequent thread of the second node upon determining that the predefined threshold buffer size is not available.

* * * * *